United States Patent [19]

Hopkins

[11] Patent Number: 4,707,325
[45] Date of Patent: Nov. 17, 1987

[54] GAUGE PLATE FOR USE IN CUSTOMIZING A REPLACEMENT UPPER CORE PLATE IN A NUCLEAR REACTOR, AND METHOD OF USING THE GAUGE PLATE

[75] Inventor: Ronald J. Hopkins, Pensacola, Fla.
[73] Assignee: Westinghouse Electric Corp., Pittsburgh, Pa.
[21] Appl. No.: 881,997
[22] Filed: Jul. 3, 1986
[51] Int. Cl.⁴ .............................. G21C 17/00
[52] U.S. Cl. .................... 376/245; 376/249
[58] Field of Search ................ 376/245, 249

[56] References Cited

U.S. PATENT DOCUMENTS

| | | | |
|---|---|---|---|
| 4,420,455 | 12/1983 | Qurwell et al. | 376/245 |
| 4,421,715 | 12/1983 | Gunter et al. | 376/249 |
| 4,425,298 | 1/1984 | Shields | 376/249 |

Primary Examiner—Salvatore Cangialosi
Attorney, Agent, or Firm—Daniel C. Abeles

[57] ABSTRACT

A gauge plate for use in customizing replacement upper core plate inserts of a nuclear reactor which comprises: a circular metal plate of a known diameter corresponding to that of the upper core plate of the nuclear reactor to be gauged; a plurality of U-shaped gauging slots of known size formed in the peripheral surface of the gauge plate at locations corresponding to the locations of the guide pins for the lower internals of the reactor; an arrangement for positioning the gauge plate within the core barrel at the normal elevation of the upper core plate inserts and the guide pins; and devices, disposed on the gauge plate, for positioning the gauge plate relative to the reactor baffle plate arrangement; and, for determining the actual position of the gauge plate relative to the baffle plate arrangement. The gauge plate is positioned in a core barrel containing a baffle plate arrangement but no upper internals so that the gauge plate rests on the upper end of the baffle plates with the guide pins extending into the gauging slots and with the gauge plate properly positioned relative to the baffle plates; the clearances between the gauge plate and the inner surface of the core barrel, and between the three sides of a gauging slot and the adjacent sides of the associated guide pin are measured at each gauging slot; and, the actual position of the gauge plate relative to the baffle plates is determined by gauging devices.

18 Claims, 5 Drawing Figures

GAUGE PLATE FOR USE IN CUSTOMIZING A REPLACEMENT UPPER CORE PLATE IN A NUCLEAR REACTOR, AND METHOD OF USING THE GAUGE PLATE

BACKGROUND OF THE INVENTION

The present invention relates to a gauge plate for determining and measuring the actual locations of the guide pins for the lower internal structure in a nuclear reactor vessel for use in customizing a replacement upper internals structural package, and to a method of using this gauge plate. More particularly, the present invention relates to a gauge plate, and a method of using same, whereby the actual position and dimensions of the existing guide pins in the barrel of a nuclear reactor vessel for the lower internal structure can be determined so that the conventional inserts for the upper core plate which mate with these guide pins can be customized to the required close tolerances when the upper internals structural package for an existing nuclear reactor is replaced.

In a liquid cooled nuclear reactor, the internal structure of the core barrel generally includes, in addition to the core itself, an upper internals structural package, which is installed and can be removed as a unit, and a lower internals structure which is axially aligned with the upper internals structural package. To ensure that the upper and lower internals structures are correctly oriented and aligned with one another, the inner surface of the core barrel is provided with a plurality, usually four, symmetrically disposed guide pins which are fixedly aligned with the lower internal structure and which extend radially inwardly from the inner wall of the core barrel and engage in respective slots formed in the peripheral surface of the upper core plate, which, in turn, forms the lower most portion of the upper internals structural package. In view of the relatively close tolerances required for the orientation of the upper and lower internal structures, it is customary to machine the surfaces of the peripheral slots in the upper core plate to general relatively large tolerances relative to the guide pins, and then to customize the upper core plate to the actual position and size of the guide pins by providing each of the perpheral slots of the upper core plate with an insert which has been finely machined to provide the desired small clearances, e.g. 0.013 cm (0.005 in.), based on actual clearance measurements.

In order to make these measurements when the reactor is initially being built at the factory, the upper internals structural package or unit, or at least the portion of same necessary to properly position the upper core plate, is placed in the core barrel and properly aligned with the lower internal structure including the baffle plate arrangement which surrounds the area in which the core is located. Thereafter, the various clearances between the surfaces of the peripheral slots in the upper core plate and the adjacent surfaces of the respective guide pins are actually measured by an individual, and then the upper internals structural package is removed from the core barrel. Thereafter, the actual measurements taken are used to machine the relatively small inserts which are then positioned and fastened in the respective perpheral slots of the upper core plate so as to customize the core plate to the actual positions of the lower internal structure.

Although the above technique is satisfactory when a new reactor is being built, a number of significant problems are presented when it is necessary to replace the upper internals structural package of a reactor which has been in use for some time. Initially, since the reactor vessel, including the core barrel with its guide pins and the fixed portions of lower internal structure, e.g., the baffle plate arrangement, are no longer located at the situs of the factory, it would be extremely difficult, time consuming and expensive, particularly in view of the large size and weight of even the upper core plate, which for example is in the order of 13-1400 kg (3000 lbs.) for a typical reactor, to ship the upper core plate, or a sufficient portion of the upper internals structural package, to the situs of the reactor, to take the necessary measurements, return the upper core plate to the factory for customizing, and then return the completed package to the reactor for ultimate installation. Moreover, since the reactor vessel of a previously operating reactor is somewhat radioactive and accordingly is conventionally flooded with water during the replacement or refitting period, it would be very difficult and extremely dangerous for an individual to take the necessary measurements in order to customize the new upper core plate to the existing guide pins in the core barrel.

SUMMARY OF THE INVENTION

It is therefore the object of the present invention to provide an apparatus for taking the measurements necessary for the customization of a replacement upper core plate, and in particular the upper core plate inserts for the peripheral guide slots, without requiring the use of the actual upper core plate for such measurements, as well as to provide a method of using the apparatus to take the measurements which overcomes the above problems.

The above object is initially achieved according to the invention by a gauge plate for use in customizing replacement upper core plate inserts of a nuclear reactor of the type including a pressure vessel, a core barrel disposed within the pressure vessel, a lower internal structure disposed in the core barrel and including a baffle plate arrangement, and an upper internals structural package having an upper core plate at its lower end, with the upper core plate being provided with a plurality of peripheral grooves, each including an insert machined to close tolerances, for engaging respective approximately rectangular shaped guide pins extending radially inwardly from the inner surface of the core barrel for aligning the upper internal structural package relative to the lower internal structure; wherein the gauge plate comprises a circular metal plate of a known diameter corresponding substantially to that of the upper core plate of the nuclear reactor to be gauged; a plurality of U-shaped gauging slots formed in the peripheral surface of the gauge plate and extending between its major surfaces, with the gauging slots being formed at locations corresponding to the respective locations of the guide pins of the reactor vessel to be gauged and being of a known size sufficient to receive the respective guide pins with clearance on all sides; first means for positioning the gauge plate within the core barrel of the nuclear reactor vessel to be gauged, while it contains the baffle plate arrangement but not the upper internals structural package, at the normal elevation of the upper core plate inserts and the guide pins; second means, disposed on the gauge plate, for positioning the gauge plate relative to the baffle plate arrangement of the reactor to be gauged; gauge means for the gauge plate for determining the actual position of the gauge plate relative to the baffle plate arrangement; and, remotely controlled measuring means, disposed on the gauge plate, for measuring the respective clearances between each of the U-shaped gauging slots and the adjacent surfaces of a respective guide pin and the clearance between the peripheral surface of the gauge plate and the inner surface of the core barrel adjacent each gauging slot, and for providing an indication of the measured clearances at a remote location.

Preferably, the gauge plate has a thickness substantially less than that of the upper core plate for the reactor, and is provided with cutouts in its interior portion in order to reduce its weight and to permit it to be more easily lowered through the flooding water.

According to the preferred embodiment of the gauge plate according to the invention, the first means comprises a plurality of support pads disposed on one major surface of the gauge plate and positioned so as to be able to rest on the upper end of the baffle plates of the baffle plate arrangement of the reactor in which said gauge plate is to be used, with the support plates being of the thickness so as to position the gauge plate at the elevation of the interface of the upper core plate inserts and the guide pins when the pads are resting on the upper ends of the baffle plates, and the second means comprises a plurality of positioning pins extending from the above mentioned major surface of the gauge plate, with the positioning pins being located on the gauge plate at respective positions corresponding to the outer most positions of the fuel assembly top nozzles of the reactor, and with each positioning pin being of a length so that it can extend into the area enclosed by the baffle plate arrangement when the gauge plate is resting on the upper ends of the baffle plates.

Moreover, in the preferred embodiment of the gauge plate according to the invention, the gauging means includes a plurality of gauging holes extending through the gauge plate for receiving gauge pins, with the gauging holes being located at positions corresponding to the expected positions of respective baffle plates of the reactor in which the gauge plate is to be used.

According to the method of the invention the actual dimensions of the lower internals guide pin locations of a nuclear reactor vessel are measured by positioning a gauge plate of the type described above in a nuclear reactor vessel core barrel containing a baffle plate arrangement, but with the upper internals structural package removed, so that the gauge plate rests on the upper end of the baffle plate arrangement with the lower internal structure guide pins of the reactor vessel extending into the gauging slots of the gauge plate and with the positioning pins of the gauge plate being properly positioned relative to the baffle plate arrangement; at each of the gauging slots and with the gauge plate in the same position, (a) measuring the difference between the peripheral surface of the gauging plate and the inner surface of the reactor barrel, and (b) measuring the clearance between each of the three sides of the U-shaped gauging slot and the adjacent sides of the associated guide pin; and, with said gauge plate in the same position, determining the actual position of the gauge plate relative to the existing baffle plates by inserting gauging means into each of the gauging holes.

According to the preferred embodiment of the method wherein the gauging plate utilized includes at least three gauging holes with two of the gauging holes being located at positions corresponding to the positions of two adjacent baffle plates and the third gauging hole being located at a position corresponding to a baffle plate diametrically opposite one of the two adjacent baffle plates, and with the center line of each of the gauging holes being displaced by a common given dimension from the expected position of the upper edge of the respective baffle plate in a direction perpendicular to the inner surface of the respective baffle plate, the actual position of the gauge plate relative to the baffle plates is determined by inserting gauge pins of known size into the gauging holes until the inner surface of the respective baffle plate is located. Preferably, gauge pins of known different size are successively inserted into one of the gauge holes to determine the largest diameter gauge pin which can be inserted, and then, with this largest diameter gauge pin inserted in its respective gauge hole, the sequence of successively inserting gauge pins is carried out for each of the other gauge holes.

Finally, according to a preferred feature of the invention, the step of determining the actual position of the gauge plate relative to the baffle plates is carried out before the measurements are taken at the respective gauging slots.

DETAILED DESCRIPTION OF THE PREFERRED EMBODIMENT

Figure 1:
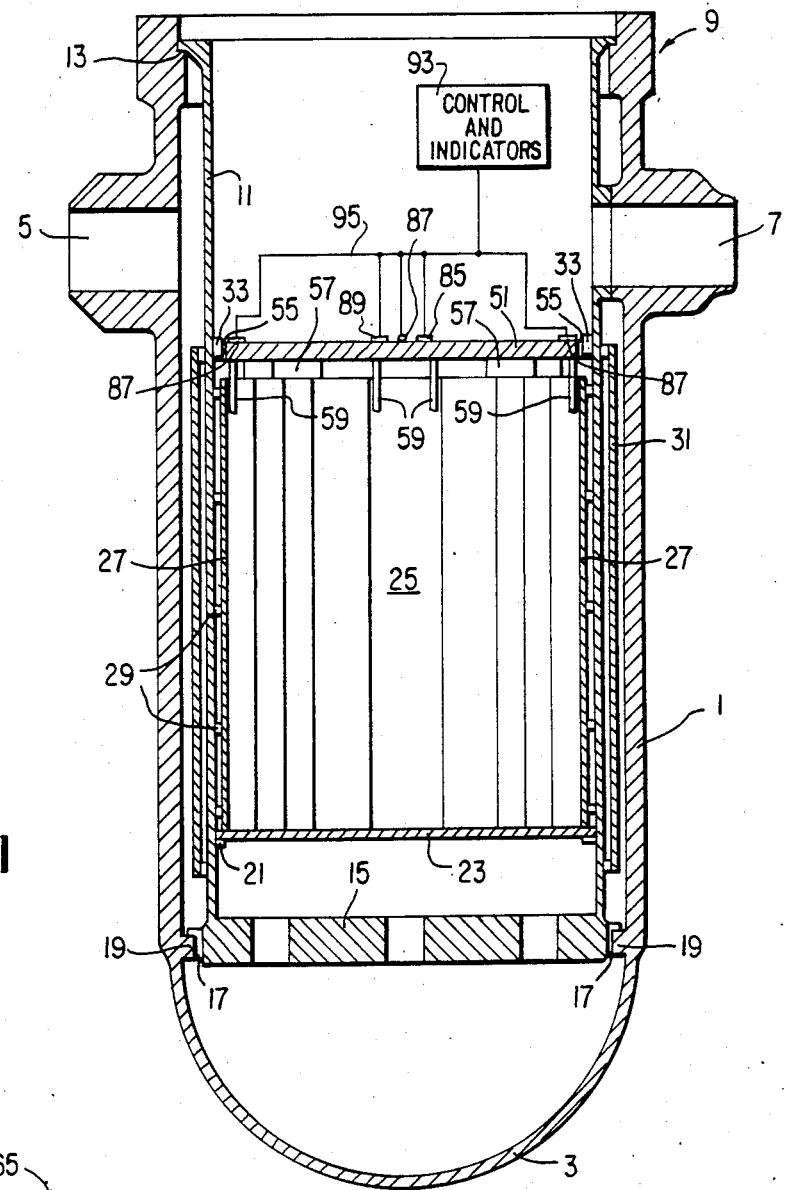
FIG. 1 is a simplified cross-sectional schematic drawing of a nuclear reactor vessel with the top closure or head assembly removed and showing the positioning of the gauge plate according to the invention.

Referring now to the drawings, and in particular FIG. 1, there is shown an elongated, generally cylindrically shaped nuclear reactor vessel 1 of conventional design for use in a pressurized water nuclear reactor system. Vessel 1 has the usual hemispherical bottom 3, at least one cooling water inlet nozzle 5, and at least one cooling water outlet nozzle 7. As is conventional, vessel 1 forms a pressurized container when sealed at its open end 9 by a head assembly (not shown). Disposed within the vessel 1 is a cylindrical core barrel 11 which is suspended from an inwardly extending flange 13 of vessel 1. Core barrel 11 includes a bottom forging 15 having a plurality of projections 17 disposed about its circumference for engaging a corresponding number of key members 19 on the vessel 1 for stablizing the position of the core barrel 11 in the circumferencial and radial directions.

Mounted within the core barrel 11 near its lower end, and connected to the inner wall of the core barrel 11 by connecting elements 21, is a lower core plate 23 on which the nuclear reactor core (not shown) and the lower internals structure of the reactor normally rest. Of the lower internals structure, the only element shown in Figure 1 is the baffle plate arrangement or baffle structure 25 formed of a plurality of individual interconnected baffle plates 27. The baffle plate structure 25 is connected to the core barrel 11 by a plurality of separater plates or spacers 29, and normally contains and surrounds the nuclear reactor core. As is more clearly shown in FIG. 2, the baffle plate structure 25 has a shape corresponding to the arrangement of the generally rectangular configurations of the fuel rod assemblies which make up the nuclear reactor core.

Normally, the space within the core barrel 11 above the baffle plate arrangement 25 contains the upper internals structural unit which, in a conventional manner, is simply suspended within the core barrel 11 in that its upper end, which is constituted by an upper support plate (not shown) is supported on the upper flange 31 of the core barrel 11. To accurately align the upper internals structural unit with the lower internals in both the circumferential and radial directions, the upper core plate (not shown in FIG. 1), which forms the lower end or bottom of the upper internals structural unit, is provided with a plurality of symmetrically disposed peripheral grooves, which engage with a like plurality of radially inwardly directed guide pins 33 fastened to the inner wall of the core barrel 11 at the normal elevation of the upper core plate. The guide pins 33 are fixed to the inner wall of the core barrel 11 so that they have a defined relationship to the lower internals structure of the reactor vessel, and in particular a defined relationship to the baffle structure 25.

As indicated above, in order to provide compensation for the various possible machining and positioning tolerance values and in order to provide accurate alignment between the upper internals structural unit and the lower internals structure, the peripheral guide or alignment grooves in the large upper core plate are machined to relatively large tolerance values, and a respective relatively small insert, which is machined to the actual required tolerance values on the basis of actual measurements, is provided and fastened in each of the peripheral guide slots or grooves and forms the actual bearing or guide surfaces between the guide pins 33 and the upper core plate. Such an insert is shown, for example, in FIG. 3.

Figure 3:
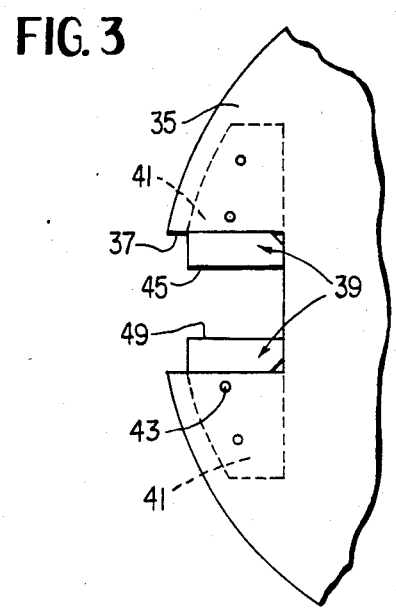
FIG. 3 is partial plan view showing one peripheral groove for an upper core plate with an upper core plate insert whose dimensions are to be customized using the gauge plate according to the invention.

As shown in FIG. 3, the upper core plate 35 has a peripheral groove 37 which extends between the two major surfaces of the core plate 35. The dimensions of this groove 37 are substantially larger than the dimensions of the corresponding guide pin 33 (FIG. 1) in both the circumferential and the radial directions. To provide the close tolerances required, a core plate insert 39 is secured within each groove 37 by means of a flange portion 41 which extends laterally beyond the dimensions of the groove 37 along the bottom surface of the upper core plate 35 and is fastened to same by means of four screws 43. The remaining portion of the core plate insert 39, which is actually within the groove 37, extends upwardly from the flange portion 41 between the two major surfaces of the upper core plate 35 and is provided with a U-shaped groove formed by two accurately machined guide surfaces 45 and 49 whose dimensions are determined on the basis of actual measurements of a respective guide pin 33 relative to a respective slot 37. The two opposed surfaces 45 and 49 are dimensioned to bear against the side surfaces of generally rectangular shaped guide pin 33 so as to accurately position the core plate 35 in the circumferential direction, while similar surfaces oriented at 90° to the surfaces 45 and 49 serve to accurately position the upper core plate 35 in the radial direction. Of course, although only one such peripheral guide groove 37 with its insert 39 is shown, it is to be understood that the upper core plate 35 has a plurality of such grooves 37 which are symmetrically disposed about its circumference, and in particular contains four such guide grooves 37 and inserts 39 disposed on the orthogonal or cardinal axes of the upper core plate 35, i.e. each groove 37 is displaced from the two adjacent grooves by 90° relative the center of the plate 35.

Figure 2:
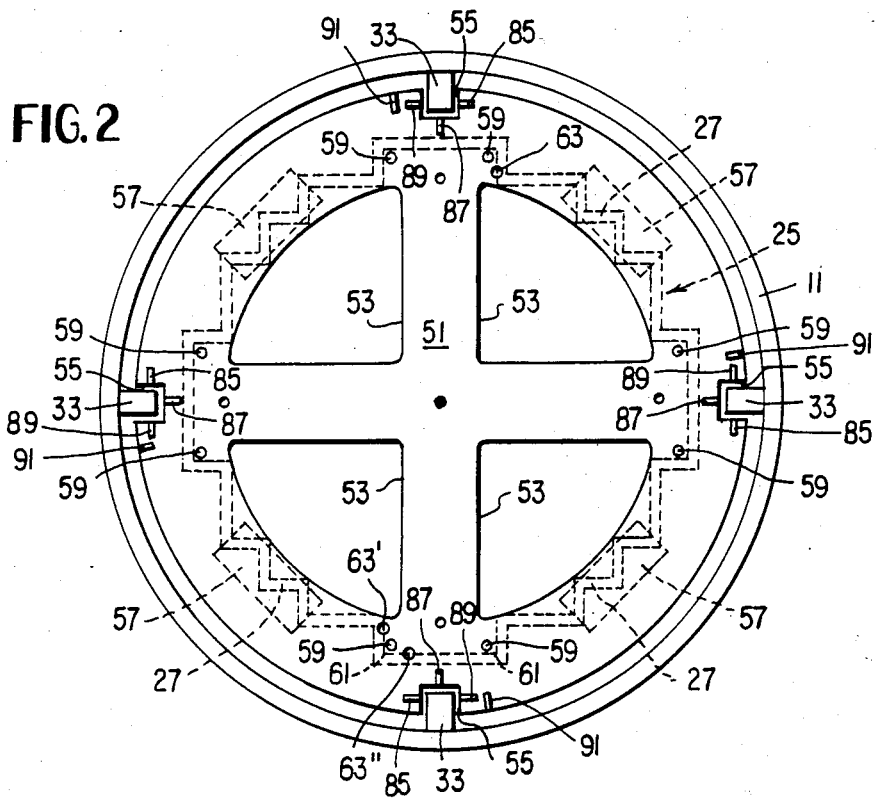
FIG. 2 is a schematic plan view of the gauge plate according to the invention showing its relationship to the lower internals guide pins and to the underlying baffle plates.

To take the measurements necessary to customize the inserts 39 for a replacement upper core plate, according to the invention, a gauge plate 51, as shown in section in FIG. 1 and in plan view in FIG. 2, is provided, with the gauge plate 51 being formed of metal, for example, of 304 stainless steel. The gauge plate 51 has an outer diameter which corresponds to that of the upper core plate which is to be replaced, but has a substantially reduced thickness in order to reduce the weight of the gauge plate 51 during use. For example, whereas the actual upper core plate may have a thickness of 7.62 cm (3 in.), the gauge plate 51 may have a thickness in the order of 1.9 cm (¾ in.). Moreover, in order to further reduce the weight of the gauge plate 51 and so as to permit it to be more easily lowered through the body of water in which the reactor vessel of FIG. 1 is normally submerged during the replacement of refitting period, the interior portion of the circular engaged plate 51 is provided with a number of cut out sections 53.

As shown in FIG. 2, the gauge plate 51 is provided with four U-shaped peripheral gauging slots 55 which are located on the cardinal axes of the gauge plate 51 and are positioned to coincide with the locations of the guide pins 33 for the lower internal structure. The gauging slots 55 are of a known size and location relative to one another and sufficiently wide so that the guide pins 33 can enter these gauging slots 55 with sufficient clearance. For example, the slots 55 may be approximately 7.16 cm (2.82 in) wide which, in a typical installation, would allow for an approximately 0.15 cm (0.06 in) radial gap on each side of the respective guide pin 33.

Since, as indicated above, the gauge plate 51 is substantially thinner than the upper core plate, it is necessary to provide some arrangement for postioning the gauge plate 51 at the elevation of the guide pins 33 within the core barrel 11. According to the preferred illustrated embodiment of the invention, this is achieved by providing the lower surface of the gauge plate 51 with a plurality, and preferably at least three, of pads 57 which are formed of metal, for example, stainless steel, and which are positioned so that they will rest on the top ends of the baffle plates 27 when the gauge plate 51 is inserted into the core barrel 11. The pads 57 are of a thickness, for example, 2.86 cm (1⅛ in), sufficient to cause the gauge plate 51, and in particular the gauging slots 55, to be at the elevation of the guide pins 33 when the pads 57 are resting on the top surface of the baffle plate structure 25 as shown in FIG. 1.

In addition to generally positioning the gauge plate 51 relative to the guide pins 33, it is likewise necessary to accurately position the gauge plate 51 relative to the baffle plate arrangement 25. For this purpose, the gauge plate 51 is provided with a plurality of positioning pins 59 which extend downwardly perpendicular to the lower major surface of the gauge plate 51, i.e. the same major surface containing the pads 57. The positioning pins 59 are located on the plate 51 at positions corresponding to the outboard or outer most positions of the fuel assembly top nozzle locations in the upper core plate so as to simulate such positions, and are of sufficient length, for example 10.16 cm (4 in) so that they can extend into the area delimited by the baffle plate arrangement 25 when the gauge plate 51 is resting on the top or end surfaces of the baffle plates 25. As shown, eight such positioning pins 59 are provided in four pairs, with two pairs of positioning pins 59 being diametrically oppositely disposed along each of the cardinal or orthogonal axes of the gauge plate 51, and with the positioning pins 59 of each pair being symmetrically disposed with respect to its associated cardinal axis. As shown in FIG. 2, the eight positioning pins 59 are in fact disposed in the respective outer most corners 61 formed between two adjacent baffle plates 27, with the individual positioning pins 59 being located on the gauge plate 51 so that they will, based on the original drawings of the particular nuclear reactor being gauged, provided an expected very small nominal clearance, for example in the order of 0.028 to 0.03 cm (0.011 to 0.014 in) with each of the associated baffle plates 27 forming the respective corner 61.

Finally, in order to determine the actual position of the existing baffle plate arrangement 25, relative to the gauge plate 51, the gauge plate is provided with a plurality of gauging holes 63, which are located at positions corresponding to the expected actual as-built locations of respective baffle plates 27. The gauging holes 63 extend completely through the gauge plate 51 and are of a sufficient diameter so that a gauging device can be inserted through each of the respective gauging holes 63 to accurately locate the actual position of the inner surface of the associated baffle plate 27. Although it is possible to provide such gauging holes 63 for a substantial plurality of the individual baffle plates 27, preferably a minimum of three such gauging holes 63 distributed as shown in FIG. 2 are provided. In particular, as shown in FIG. 2, two of the gauging holes 63' and 63" are associated with the individual baffle plates 27 forming one outer most corner 61, while third gauging hole 63 is associated with the baffle plate 27 diametrically opposed to one of the two baffle plates 27 associated with the pair of gauging holes 63' and 63". Preferably, as shown, the single gauging hole 63 is associated with a radially extending baffle plate 27.

Figure 4:
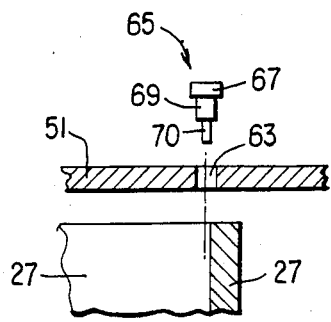
FIG. 4 is a schematic partial side view illustrating the use of gauge pins to determine the position of the baffle plate relative to the gauge plate.

According to the preferred embodiment of the invention, the gauging device used with the gauging holes 63 in order to determine the actual position of the inner surface of the respective baffle plates 27 is a step gauge pin 65 as shown in FIG. 4, which includes a cap 67, a collar 69 of the same diameter as the gauging hole 63, and a lower pin portion 70 of a know gauging diameter. To take the measurements, a plurality of pins 65 with different known diameter portions 70 are provided. Alternatively, a single step gauge pin 65 with a plurality of successive different diameter portions 70 may be utilized. In any case, in order to utilize the step gauge pin 65 as a go, no-go type gauge, each of the gauging holes 63 is positioned relative to its associated baffle plate 27 so that the center line of the gauging hole 63 is displaced or offset by a given known amount from the expected location of the inner surface of the associated baffle plate 27 in a direction perpendicular to this inner surface. More particularly, the center line of each gauging hole 63 is offset by a distance equal to the radius of a desired size step gauge pin portion 70 so that if, for example, the center line of the gauging hole 63 is offset by 1.27 cm (0.50 in), the gauge plate 51 will be in the optimum or best position relative to the associated baffle plate 27 if a gauge pin with a portion 70 having a diameter of 2.54 cm (1 in) can be inserted into a gauging hole 63, but a gauge pin with a diameter of 2.67 cm (1.05 in) cannot be inserted.

To utilize the above described gauge plate 51 for its intended purpose, the gauge plate 51 is lowered into the core barrel 11, for example, by means of an overhead crane, until its pads 57 rest on the upper end surfaces of the baffle plate arrangement 25. During the lowering procedure the gauge plate 51 is oriented so that, when the plate 51 is at rest the respective guide pins 33 extend into the respective gauging slots 55 and the plurality of positioning pins 59 extend into the respective corners 61 formed by adjacent baffle plates 27. Thereafter, the desired measurements at each of the gauging slots 55 and at each of the gauging holes 63 is carried out with the gauge plate 51 in the same position. Preferably, in order to clearly establish a reference position for the gauge plate 51 relative to the baffle plate arrangement 25, the measurements at the respective gauging holes 63 are carried out before the measurements at the respective gauging slots 55. More specifically, at each of the gauging holes 53, a step gauge pin 65 with the standard or desired diameter portion 71 is inserted into a respective gauging hole 63, and if it can be inserted, an attempt is made to insert the next larger diameter step gauge pin 65 until the step gauge pin with the largest diameter which can be inserted into the gauging hole 67 is determined and noted. This procedure is repeated for each of the gauging holes 63 with the largest diameter step gauge pin 65 which can be inserted preferably being allowed to remain in the respective gauging holes 63 so as to firmly fix the position of the gauging plate 51 relative to the baffle plate arrangement 25. Thereafter, the desired measurements are taken at each of the gauging slots 55.

Figure 5:
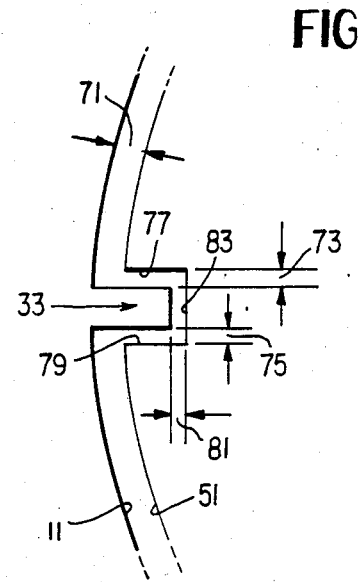
FIG. 5 is an enlarged schematic view illustrating the measurements to be taken adjacent each peripheral groove of the gauge plate.

As illustrated in FIG. 5, four measurements are taken at each of the gauging slots 55. More specifically, using the known outer diameter of the gauge plate 51 as a reference, the inner diameter of the core barrel 11 at the elevation where it interfaces with the upper core plate is determined by measuring the gap or distance 71 between the periphery of the gauge plate 51 and the inner surface of the core barrel 11. Additionally, the two radial gaps 73 and 75 between the respective radially extending surfaces 77 and 79 of the generally U-shaped gauging slot 55 and the respective facing adjacent side surfaces of the guide pin 33 are measured and recorded. Finally the circumferential gap 81 between the circumferential gauging surface 83 of the gauging slot 55 and the end surface of the guide pin 33 is measured and recorded. The measurement of the gaps 71, 73, 75 and 81 are carried out at each of the four gauging slots 55 of the gauge plate 51. Since all of the dimensions of the gauge plate 51 are accurately known, the measured data, as indicated above, can be used to customize the replacement upper core plate inserts so that the replacement upper internals structural unit will be compatible with the existing lower internals structure in an operating nuclear reactor plant. Moreover, as can easily be appreciated, since all of the dimensions of the gauge plate 51 are accurately known prior to the measurements, the gauge plate 51 itself need not even be returned to the factory where the replacement parts are being manufactured. That is, all that need be sent to the factory is the results of the various measurements.

As indicated above, during the replacement or refitting period of the nuclear reactor, as well as during the measuring process with the gauge plate 51, the reactor vessel 1 is normally submerged in water in order to provide protection against radioactivity. Accordingly, it is desirable for all of the measurements indicated above to be controlled and/or read out from a remote location. This can be accomplished, for example, by means of remotely controlled robot arms (not shown) as are well known in this art and/or by conventional remotely controlled linear measuring instruments disposed on the gauge plate 51 or on a remotely controlled robot arm. According to the preferred mode of carrying out the method according to the invention, the insertion of the step gauge pins 65 is carried out by a remotely controlled robot arm, while the respective measurements of the gaps 71, 73, 75 and 81 at each gauging slot 55 are carried out by respective sets of four measuring devices which are appropriately mounted at known positions on a major surface of the gauge plate 51. More particularly, as shown in FIGS. 1 and 2, respective sets of measuring devices 85, 87, 89 and 91 are mounted at known positions on the upper surface of the gauge plate 51 adjacent each of the gauging slots 55. Each of the measuring devices 85, 87 and 89 is disposed adjacent, and has its longitudinal axis perpendicular, to a respective one of the surfaces 77, 83 and 79 of the associated slot 55 so as to measure the respective gaps 73, 81 and 75 between the respective slot surfaces and the adjacent surfaces of the guide pin 33. The remaining measuring device 91 of each set is disposed adjacent the peripheral surface of the gauge plate 51 and has its longitudinal axis extending in a raidal direction so as to measure the gap 71 between the peripheral surface of the gauge plate 51 and the adjacent inner surface of the core barrel 11.

The measuring devices 85, 87, 89 and 91 may, for example, each simply be a spring loaded plunger which, when released from a remote location, will move forward until it rests against a respective one of the three measuring surfaces of the associated guide pin 33 (devices 85, 87, 89) and against the inner surfaces of the core barrel 11 (device 91) and reamin locked in that position. The actual dimensions of the various gaps are then determined by manually measuring the positions of sixteen plungers, for example, by means of a micrometer, after the gauging plate 51 has been removed from the reactor vessel 1. Preferably, however, measuring devices 85, 87, 89, 91 are provided which can be remotely controlled and will additionally produce a direct remote readout of the measured clearances. For example, each of the measuring devices 85, 87, 89 and 91 can be a spring loaded plunger which is provided with an electrical position sensor which produces an electrical signal proportional to the distance moved by the respective plunger and which is individually connected to a remotely located control and indicator circuit 93 via respective wires of a multi-conductor cable 95 (shown schmatically in FIG. 1). It is of course understood, that the position of the circuit 93 in FIG. 1 is schematic only and in reality would be located outside of the reactor vessel 1 and at a safe distance from same.

It will be understood that the above description of the present invention is susceptible to various modifications, changes and adaptations, and the same are intended to be comprehended within the meaning and range of equivalents of the appended claims.

I claim:

1. A gauge plate for use in customizing replacement upper core plate inserts of a nuclear reactor of the type including a pressure vessel, a core barrel disposed within the pressure vessel, a lower internal structure disposed in the core barrel and including a baffle plate arrangement, and an upper internals structural package having an upper core plate at its lower end, with the upper core palte being provided with a plurality of peripheral grooves which each contain an insert machined to close tolerances for engaging respective approximately rectangular shaped guide pins extending radially inwardly from the inner surface of the core barrel for aligning the upper internals structural package relative to the lower internal structure, said gauge plate comprising:

a circular metal plate of a known diameter corresponding substantially to that of the upper core plate of the nuclear reactor to be gauged; a plurality of U-shaped gauging slots formed in the peripheral surface of said gauge plate and extending between its major surfaces, said gauging slots being formed at locations corresponding to the respective locations of the radially inwardly directed guide pins of the reactor to be gauged and being of a known size sufficient to receive the respective guide pins with clearance on all sides; first means for positioning said gauge plate within the nuclear reactor vessel to be gauged, while it contains a baffle plate arrangement but not the upper internals structural package, at the normal elevation of the upper core plate inserts and the guide pins; second means, disposed on said gauge plate, for positioning said gauge plate relative to the baffle plate arrangement of the reactor to be gauged; gauge means in said gauge plate for determining the actual position of the gauge plate relative to the baffle plate arrangement; and remotely controlled measuring means, disposed on said gauge plate, for measuring the clearances between each of said U-shaped gauging slots and the adjacent surfaces of a respective guide pin and the clearance between the peripheral surface of said gauge plate and the inner surface of the core barrel adjacent each said gauging slot, and for providing an indication of the measured clearances at a remote location.

2. A gauge plate as defined in claim 1 wherein said gauge plate has a thickness substantially less than that of the upper core plate for the reactor.

3. A gauge plate as defined in claim 1 wherein said first means comprises a plurality of support pads disposed on one major surface of said gauge plate and positioned so as to be able to rest on the upper end of the baffle plates of the baffle plate arrangement of the reactor in which said gauge plate is to be used, said support pads being of a thickness so as to position said gauge plate at the elevation of the interface of the upper core plate inserts and the guide pins when said pads are resting on the upper ends of the baffle plates.

4. A gauge plate as defined in claim 3 wherein said second means comprises a plurality of positioning pins extending from said one major surface of said gauge plate, with said positioning pins being located on said gauge plate at respective positions corresponding to the outer most positions of the fuel assembly top nozzles of the reactor, and with each being of a length so that it can extend into the area enclosed by the baffle plate arrangement when said gauge plate is resting on the upper ends of the baffle plates.

5. A gauge plate as defined in claim 4 wherein eight of said positioning pins are provided in four pairs, with two of said pairs of being located along each of the respective cardinal axes of the surface of said gauge plate, with the two said pairs along each cardinal axis being diametrically opposed, and with said positioning pins of each said pair being symmetrically disposed with respect to the associated cardinal axis.

6. A gauge plate as defined in claim 4 wherein said gauging means includes a plurality of gauging holes extending through said gauge plate for receiving gauge pins, with said gauging holes being located at positions corresponding to the expected positions of respective baffle plates of the reactor in which the gauge plate is to be used.

7. A gauge plate as defined in claim 6 wherein said gauging holes are located at positions corresponding to the expected positions of respective baffle plates which cooperate with said positioning pins to position said gauge plate.

8. A gauge plate as defined in claim 6 wherein three of said gauging holes are provided with two of said gauging holes being located at positions corresponding to the positions of two adjacent baffle plates and the third gauging hole being located at a position corresponding to a baffle plate diametrically opposite one of said two adjacent baffle plates.

9. A gauge plate as defined in claim 8 wherein the center line of each of said gauging holes is displaced by a common given dimension from the expected position of the upper edge of the respective baffle plate in a direction perpendicular to the inner surface of the respective baffle plate.

10. A gauge plate as defined in claim 1 wherein said plate includes a plurality of relatively large area openings extending between the major surfaces in the interior portion of said plate.

11. A gauge plate as defined in claim 1 wherein four of said gauging slots are provided with said gauging slots being symmetrically disposed about the circumference of said gauge plate.

12. A gauge plate as defined in claim 1 wherein said measuring means comprises a respective set of four linear measurement devices mounted on the upper major surface of said guage plate adjacent each said U-shaped gauging slot, with three of said measurement devices each being disposed adjacent and perpendicular to a respective one of the three surfaces defining a respective U-shaped gauging slot and the fourth of said measuring devices being adjacent the periphery of said gauge plate and oriented in a radial direction.

13. A method of measuring and providing actual dimensions of the lower internals guide pin locations of a nuclear reactor vessel for use in customizing a replacement upper internals structural package so that it will mate with existing lower internal structure using a gauge plate as defined in claim 6 comprising the steps of:
positioning the gauge plate in the core barrel of a nuclear reactor vessel containing a baffle plate arrangement but with the upper internals structural package removed, so that the gauge plate rests on the upper end of the baffle plate arrangement with the guide pins of the reactor vessel extending into the respective guaging slots of the gauge plate and with the positioning pins of the guage plats being properly positioned relative to the baffle plate arrangement; at each of said gauging slots and with the gauge plate in the same position, (a) measuring the difference between the peripheral surface of the gauge plate and the inner surface of the reactor core barrel, and (b) measuring the clearance between each of the three sides of the U-shaped gauging slot and the adjacent sides of the associated guide pin; and, with the gauge plate in the same position, determining the actual position of the gauge plate in relation to the baffle plates by inserting gauging means into each of the gauging holes.

14. A method as defined in claim 13 wherein the gauge plate includes at least three gauging holes with two of the gauging holes being located at positions corresponding to the positions of two adjacent baffle plates and the third gauging hole being located at a position corresponding to a baffle plate diametrically opposite one of the two adjacent baffle plates, and with the center line of each of the gauging holes being displaced by a common given dimension from the expected position of the upper edge of the respective baffle plate in a direction perpendicular to the inner surface of the respective baffle plate; and wherein said step of determining the actual position of the gauge plate relative to the baffle plates includes inserting gauge pins of known size into the gauging holes until the inner surface of the respective baffle plate is located.

15. A method as defined in claim 14 wherein said step of inserting includes successively inserting gauge pins of known different size into one of the gauge holes to determine the largest diameter gauge pin which can be inserted, and then, with this largest diameter gauge pin inserted in its respective gauge hole, repeating said step of successively inserting for each of the other gauge holes.

16. A method as defined in claim 15 wherein said step of determining the actual position of the gauge plate relative to the baffle plates is carried out before said steps (a) and (b).

17. A method of measuring and providing actual dimensions of the lower internals guide pin locations of a nuclear reactor vessel for use in customizing a replacement upper internals structural package so that it will mate with existing lower internal structure using a gauge plate including: a circular metal plate of a known diameter corresponding substantially to that of the upper core plate of the nuclear reactor to be gauged; a plurality of U-shaped gauging slots formed in the peripheral surface of said gauge plate and extending between its major surfaces, said gauging slots being formed at locations corresponding to the respective locations of the radially inwardly directed guide pins provided on the inner surface of the core barrel of the reactor to be gauged and being of a known size sufficient to receive the respective guide pins with clearance on all sides; a plurality of support pads disposed on one major surface of said gauge plate and positioned so as to be able to rest on the upper end of the baffle plates of the baffle plate arrangement of the reactor in which said gauge plate is to be used, with said support pads being of a thickness so as to position said gauge plate at the normal elevation of the interface of the upper core plate and the guide pins when said pads are resting on the upper ends of the baffle plates; a plurality of positioning pins extending from said one major surface of said gauge plate, with said positioning pins being located on said gauge plate at respective positions corresponding to the outer most positions of the fuel assembly top nozzles of the reactor, and with each being of a length so that it can extend into the area enclosed by the baffle plate arrangement when said gauge plate is resting on the upper ends of the baffle plates; at least three gauging holes extending through said gauge plate for receiving gauge pins, with two of said gauging holes being located at positions corresponding to the expected positions of two adjacent baffle plates and the third gauging hole being located at a position corresponding to a baffle plate diametrically opposite one of said two adjacent baffle plates, and with the center line of each of said gauging holes being displaced by a common given dimension from the expected position of the upper edge of the respective baffle plate in a direction perpendicular to the inner surface of the respective baffle plate; said method comprising the steps of:

positioning the gauge plate in the core barrel of a nuclear reactor vessel containing a baffle plate arrangement but with the upper internals structural package removed, so that the gauge plate rests on the upper end of the baffle plate arrangement with the guide pins of the reactor vessel extending into the respective gauging slots of the gauge plate and with the positioning pins of the gauge plate being properly positioned relative to the baffle plate arrangement; successively inserting gauge pins of known different size into one of the gauging holes to determine the largest diameter gauge pin which can be inserted, and then, leaving this largest diameter gauge pin inserted in its respective gauging hole; repeating said steps of successively inserting and leaving for each of the other gauging holes; and thereafter, at each of said gauging slots, (a) measuring the clearance between the peripheral surface of the gauging plate and the inner surface of the reactor core barrel, and (b) measuring the clearance between each of the three sides of the U-shaped gauging slot and the adjacent sides of the associated guide pin.

18. A method as defined in claim 17 wherein said steps of measuring and said step of inserting are controlled and carried out from a remote location.

* * * * *